United States Patent
Doolittle

(12) 
(10) Patent No.: US 6,374,962 B1
(45) Date of Patent: Apr. 23, 2002

(54) DRUM BRAKE WITH DUAL-ACTUATION

(75) Inventor: James E. Doolittle, Granger, IN (US)

(73) Assignee: Robert Bosch Corporation, Broadview, IL (US)

( * ) Notice: Subject to any disclaimer, the term of this patent is extended or adjusted under 35 U.S.C. 154(b) by 0 days.

(21) Appl. No.: 09/916,708

(22) Filed: Jul. 27, 2001

(51) Int. Cl.[7] ............................................. F16D 65/56
(52) U.S. Cl. .................. 188/106 F; 188/325; 188/327; 188/2 D; 188/196 BA; 188/79.51
(58) Field of Search ............................ 188/106 F, 325, 188/327, 328, 329, 106 A, 79.51–79.64, 2 D, 196 BA; 29/78, 402.08, 402.01, 469

(56) References Cited

U.S. PATENT DOCUMENTS 5,553,687 A * 9/1996 Riout ........................ 188/325

* cited by examiner

*Primary Examiner*—Douglas C. Butler
(74) *Attorney, Agent, or Firm*—Leo H. McCormick, Jr.; Warren Comstock

(57) ABSTRACT

A drum brake assembly (10) having first (12) and second (14) brake shoes retained on a backing plate (16). Each of the first (12) and second (14) brake shoes have an end (22,24) aligned on a hydraulic actuator assembly (26) and an end (28,30) aligned on an anchor block (40). An adjustable strut mechanism (32) has a extendable shaft (33) that includes a first end member (34) that engages the first end (22) of said first brake shoe (12), a second end member (36) that engages the first end (24) of the second brake shoe (14) and a rotatable stem (35). A first resilient member (150) urges the first (12) and second (14) brake shoes toward the hydraulic actuator assembly (26) and second resilient member (48) urges the first (12) and second (14) brake shoes toward the anchor block (40). The length of the extendable shaft (33) is adjusted by ratcheting a pawl (65) rotating the stem (35) to establish a predetermined running clearance between the first (42) and second (44) friction members and drum (46).

10 Claims, 2 Drawing Sheets

DRUM BRAKE WITH DUAL-ACTUATION

This invention relates to a drum brake having a dual mode of operation. In a service mode, a hydraulic actuator moves friction members on brake shoes into engagement with a drum to effect a first brake application and in a parking brake mode, a mechanically operated lever pivots on an end member of an adjustable strut to move the friction members into engagement with the drum and effect a second brake application.

BACKGROUND OF THE INVENTION

Duo-mode drum brakes of a type disclosed in U.S. Pat. Nos. 4,249,646 and 4,364,456 are frequently used in combination on vehicles having front wheel disc brakes. For parking brake functions, the disc brake is mechanically actuated by applying a force through a lever arm that is carried on a web of a brake shoe. The lever arm has a first end which is pivotally attached to the web and a second end which is linked to a cable located adjacent a pivot block. The cable typically being attached to the second end in a manner as disclosed in U.S. Pat. No. 5,706,914. The mechanical actuation of this type drum brake is capable of providing sufficient braking force for parking and is adequate for most applications, however, the cost associated with manufacturing has resulted in customers requesting an alternate for implementing the function of a parking brake. In-addition when this type brake is used on vehicles identified as sport-utility models it is desirous to have all components as far away from the ground as possible to avoid the engagement with sand, rocks, stumps, and non-level ground.

In an effort to develop a robust brake for the rear of a front wheel drive vehicle it has been proposed to use disc brakes on all of the wheels and provide for a parking brake function through a drum brake-disc brake, as disclosed in U.S. Pat. Nos. 5,180,037 and 5,529,149 and commonly referred to as drum-in-hat. The drum brake in this structure is actuated through a scissors arrangement that responds to mechanical input. In an effort to simplify a parking brake structure, a lever arrangement, of the type disclosed in U.S. Pat. Nos. 5,311,971 and 6,206,148, extends through a backing plate and responds to a linear force to provide a mechanical force for activating a parking brake. This structural arrangement performs in an adequate manner but the cost and weight has resulted in some manufacturers looking for a low cost and lightweight brake. The structure disclosed in U.S. Pat. Nos. 5,311,793 and 6,234,281 simplified the parking brake function but would require a manual adjustment to maintain a desired running clearance during the operational life of the friction material of the brakes.

SUMMARY OF THE INVENTION

On review of the use and performance required for braking a front wheel driven vehicle or a rear wheel drive on an all wheel drive vehicle, it was determined that a drum brake could meet the operational requirements and the parking brake function could be achieved through a dual use of an adjustable strut assembly for a drum brake.

In the present invention, a drum brake assembly has first and second brake shoes that are retained on a backing plate by first and second pins. Each of the first and second brake shoes has a first end that engage a hydraulic actuator assembly and a second end aligned on and urged toward an anchor block on the backing plate by a spring arrangement. The first ends are spaced apart by the adjustable strut assembly that has an extendable shaft with a first end separated from a second end by a rotatable stem. A first slot in the first end engages a first web of the first brake shoe adjacent its first end to prevent the first end from rotating. Similarly, the second end has a second slot that engages a second web of the second brake shoe adjacent its first end to prevent the second end from rotating. The rotatable stem has a first cylindrical surface retained in a bore in the first end, a second cylindrical surface that engages the first end and a third cylindrical surface with first threads thereon which mate with second threads in its second end. The rotatable stem is selectively adjusted by a ratcheting action of an arm carried on the first web such that its first end moves toward the first web and its second end moves toward the second web to maintain a predetermined running clearance between a drum and a first friction pad on the first brake shoe and a second friction pad on the second brake shoe. The hydraulic actuator assembly is responsive to a first input to respectively move the first friction pad and the second friction pad into engagement with the drum to effect a first brake application. A mechanical actuator is connected to the strut mechanism to provide a second input to respectively move the first and second friction pads into engagement with the drum to effect a second brake application. The mechanical actuator is characterized in that the second end of said extendable shaft is defined by a flat base having a substantially first oval shape that transitions into a cylindrical projection. The second threads that mate with the first threads on the rotatable stem are located in the cylindrical projection and the second slot is located in the flat base along an axis of the second threads. The flat base has a first hole located adjacent the second slot for receiving a pin which extends through a second hole in a second flat base that forms a first end of a lever. The first end of the lever is offset from its second end such that the second end is substantially in a plane parallel with the rotatable stem when a ledge on the second flat base engages the second web. The pin that extends through the first hole and the second hole maintains the first flat base and the second flat base in substantially parallel planes. Linkage consisting of a cable extends through the backing plated is attached to the second end of the lever and on receipt of a linear force applied to the second end along a plane perpendicular to the rotatable stem causes the second flat base to pivot on the pin and transfer an axial force from the ledge into the second web substantially along the axis of the cylindrical projection to effect a parking brake application.

An advantage of the present invention resides in a mechanical actuator with an extendable strut having a first end member with a substantially oval shape which is aligned with an end of a lever having a semi-oval shape by a pin to locate a ledge on the semi-oval shape with a web of a brake shoe such that an input force applied to the lever causes the first end to pivot on the pin and transmit a axial force through the extendable strut to effect a parking brake function of a vehicle.

A further advantage of this invention is to provide a drum brake with a dual mode of actuation whereby a service brake is converted to a parking brake by substituting a manual input through a lever carried on a adjustable strut which maintains a desired running clearance.

DETAILED DESCRIPTION

Figure 1:
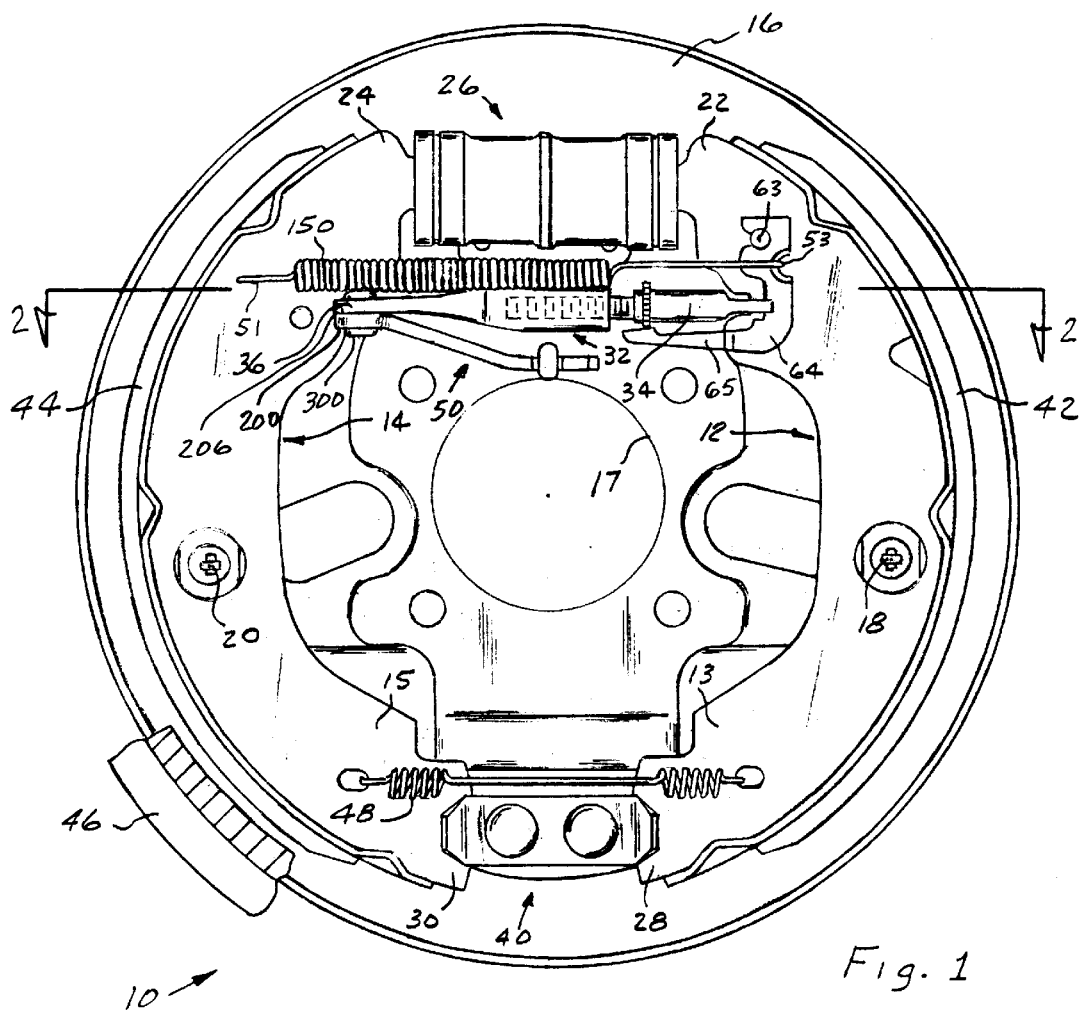
FIG. 1 is a schematic front illustration of a drum brake with an adjuster mechanism and a high entry lever arrangement made according to the present invention to provide for mechanical engagement of brake pads with a drum to effect a parking brake application.
Figure 2:
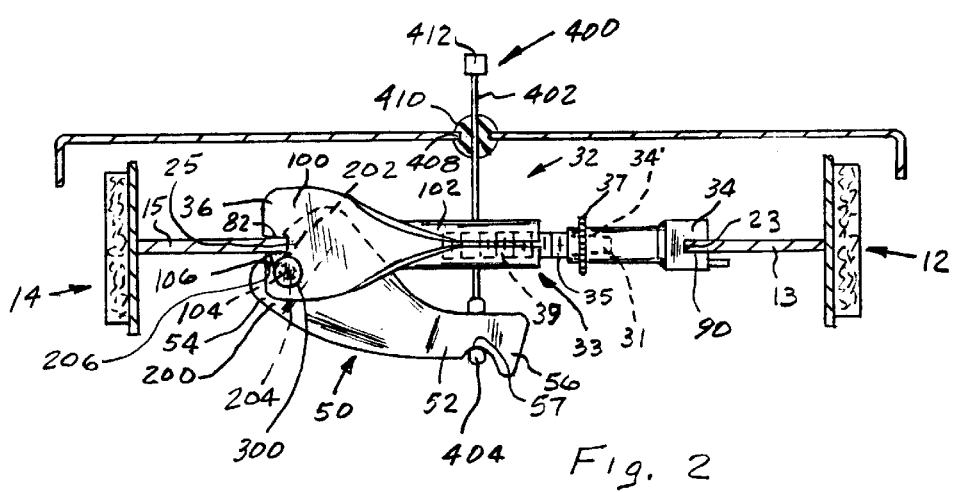
FIG. 2 is a sectional view taken along line 2—2 of FIG. 1 illustrating lever and adjuster mechanism.

The drum brake 10 shown in FIG. 1 as shown in FIGS. 1 and 2 includes a backing plate 16 with an opening 17 for receiving an axle shaft of a vehicle. A hydraulic actuator assembly 26 is located at the top of the backing plate 16 and an anchor block 40 is aligned on the bottom of the backing plate 16. First 12 and second 14 brake shoes are retained on the backing plate 16 by first 18 and second 20 pins connected to a backing plate 16. Brake shoe 12 has a first end 22 and brake shoe 14 has a first end 24, respectively, connected to a hydraulic actuator assembly 26. Further brake shoe 12 has a second end 28 and brake shoes 14 has a second end 30, respectively, connected to anchor block 40 attached to the backing plate 16. An adjuster strut mechanism 32 of a type illustrated in U.S. Pat. Nos. 4,502,574 and 5,480,010 is located between the webs 13 and 15 of brake shoes 12 and 14 respectively, to maintain a predetermined running clearance between first 42 and second 44 friction pads and a drum 46. A first spring arrangement 48 is connected to the first 12 and second 14 brake shoes for respectively urging the second ends 28,30 toward the anchor post 40. A second spring arrangement 150 has a first end 51 connected to web 15 and a second end 53 connected to indexing lever 64 retained on web 13 to urge the first ends 22,24 into engagement with the hydraulic actuator 26 and a first end member 34 and a second end member 36 of the adjustable strut mechanism 32. A actuation input in the form of pressurized fluid supplied to hydraulic actuator 26 acts on and moves the first ends 22,24 outward to bring friction pads 42,44 into engagement with drum 46 to effect a first brake application during a service mode of operation.

The adjustable strut mechanism 32 includes a shaft 33 with a first end member 34 and a second end member 36 separated by a rotatable stem member 35. The stem member 35 has a first cylindrical surface 31 retained in the first end member 34, a second cylindrical surface 37 with a series of teeth thereon and a third cylindrical surface 39 with first threads thereon which mates with corresponding second threads located in the second end member 36. The indexing lever 64 which is pivotally attached to web 13 of brake shoe 12 by pin 63 has a pawl 65 which cooperates with the teeth on the third cylindrical surface 37 to incrementally rotate shaft 33 and extend the length the adjustable strut mechanism 32 to maintain a desired clearance between the friction pads 42,44 and brake drum 46.

A mechanical actuator 50 is connected to the second end member 36 of the adjustable strut mechanism 32 to provide a manual input which moves the first ends 22,24 outward to bring friction pads 42,44 into engagement with drum 46 to effect a second or parking brake application.

Figure 3:
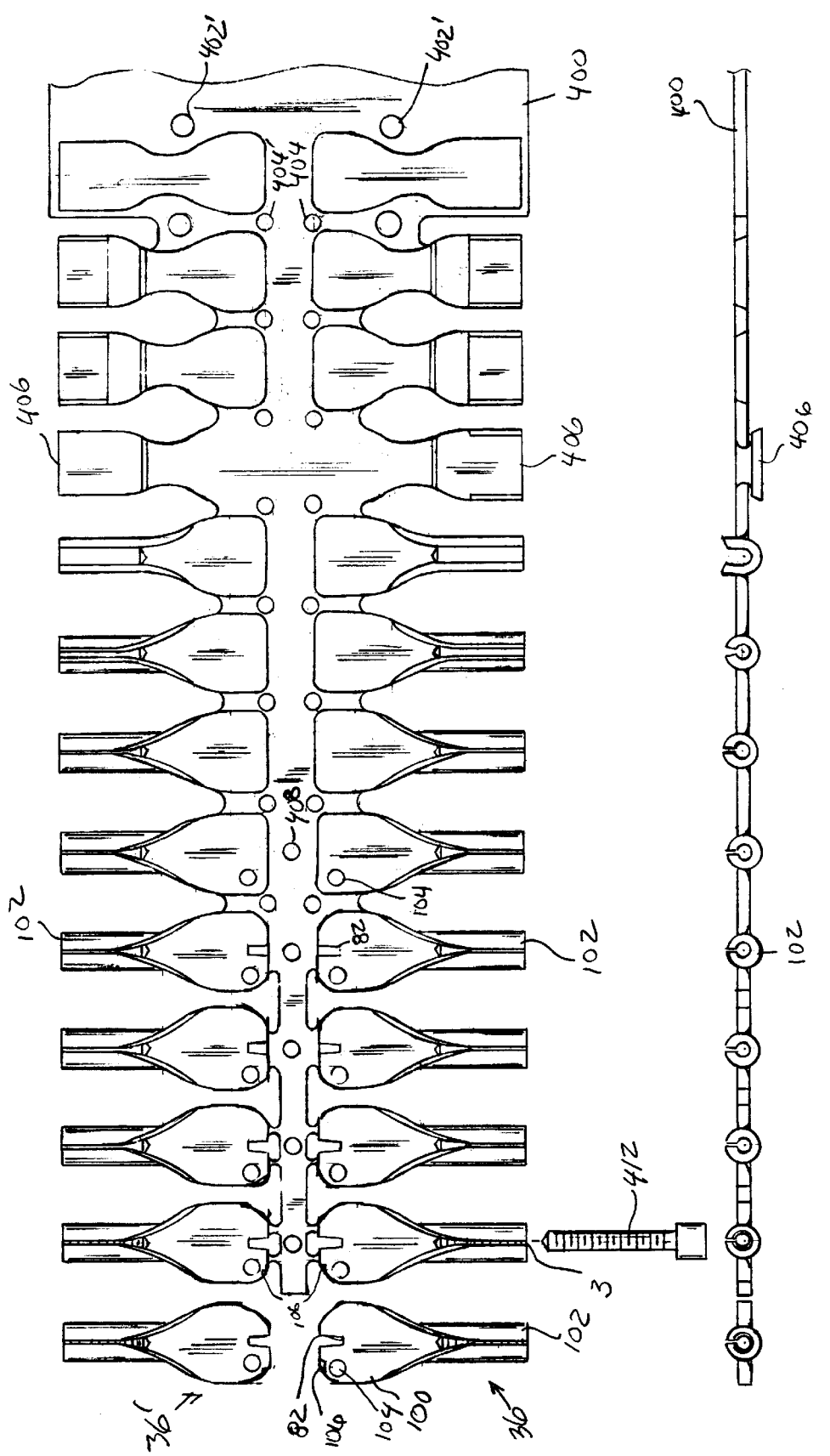
FIG. 3 is a schematic illustration of a sequence for stamping an end member for the adjuster mechanism of FIG. 2.

In more particular detail, second end member 36 of the extendable shaft 33 is manufacture by a stamping process as illustrated in FIG. 3 wherein a roll of steel 400 is processed through a die having a series of stations. The die is arranged such that identical right hand and a left hand end members 36,36' are produced together for use in a vehicle.

At a first station the roll of steel is flattened and an outline of the resulting end member 36 stamped on the roll of steel 400. At this step holes 402,402', and 404,404' are punched to provide a guide and to pull the roll of steel through a continuous die. As the roll of steel 400 is pulled through the die, material is sequentially removed from the roll to achieve a desired shape for the end member 36. Initially, a that portion of the material surrounding holes 402,402' is removed by a series of engagements and ends 406,406 bent or offset from the flat roll of steel as shown in the profile view hereof. Thereafter, the flat ends 406,406' are progressively formed around a mandrel to define a cylindrical projection 102. At a station during the forming of the cylindrical projection 102, hole 408 is essentially punched along a centerline of the roll of steel 400 and hole 104 is punched along the end of the outline. After the cylindrical projection 102 is formed, material is removed which contains holes 402,402', slot 82 is punched along a center line of the cylindrical projection 102 and the ends of the outline removed to define an oval shape. The progressive removal of material continues and at a station threads are cut into the cylindrical projection 102 by machine 412, a notch 106 is stamped adjacent hole 104 and finally the material with hole 408 therein removed to define the final end member 36.

After a final stamping step, the resulting second end members 36,36' each have a flat base 100 with a substantially first oval shape that transitions into a cylindrical projection 102, with threads are cut into the cylindrical projection 102, a slot 82 located in flat base 100 along the axis of the threads, a hole 104 located adjacent the slot 82 and a notch 106 on a peripheral surface of the flat base 100.

A lever 52 is also stamped from a roll of steel by a process to produce a member having a first end 54 has a flat base 200 with a semi-oval shape thereon which is offset from a second end 56. The flat base 200 has a ledge 202 thereon with a hole 204 located adjacent ledge 202 while the second end 56 has a groove 57 thereon. The flat base 200 also has a projection 206 on the edge thereof.

Lever 52 is attached to the second end member 36 of the extendable shaft 33 by a pin 300 that extends through hole 104 in flat base 100 and hole 204 in flat base 200. Pin 300 acts on and maintains flat base 100 and flat base 200 in substantially parallel planes. When the second end 36 of the extendable strut 33 is positioned between the first brake shoe 12 and the second brake shoe 14, ledge 202 engages web 15 and the second end 56 of lever 52 is located in a plane substantial parallel with the cylindrical projection 102 of second end 36. Radial projection 206 is aligned in notch 106 to limit the rotation of the lever 52 and assure that the second end 56 is located in the parallel relationship with the cylindrical projection 102.

Linkage 400 including a cable 402 is attached to the second end 56 of lever 52 by locating a loop 404 in groove 57. The cable 402 is located in a plane perpendicular to the backing plate 16 and extends through a grommet 410 in hole 408. A collar 412 is attached to the cable 400 on the exterior side of backing plate 16 to limit the length of cable 400 that may be located in the interior of the backing plate 16.

Method of assembly of the Drum Brake

The drum brake 10 can be assembled by the following steps:

a first brake shoe 12 is affixed to a backing plate 16 by a pin 18, the first brake shoe 12 having a first web 13 with a first end 22 and a second end 28 with a first shoulder 23 adjacent its first end 22;

a second brake shoe 14 is affixed to the backing plate 16 by a pin 20, the second brake shoe 12 having a second web 15 with a first end 24 and a second end 30 with a second shoulder 25 adjacent its first end 24;

a strut mechanism 33 is placed between the first web 13 and the second web 15 such that a first slot 90 on a first end member 34 thereof is located on the first shoulder 23 and receives the first web 13 to prevent the first end member 34 from rotating and a second slot 82 on a second end member 36 is located on the second shoulder 25 and receives the second web 15 to prevent the second end member 36 from rotating, the first end member 34 being separated from the second end member 36 by a rotatable stem 35 having a first cylindrical surface 31 retained in a bore 34' in the first end member, a second cylindrical surface 37 that engages the first end member 34 and a third cylindrical surface 39 with first threads thereon which mate with second threads in the second end member 36, the second end member 36 having a first flat base 100 with a substantially first oval shape that transitions into a cylindrical projection 102, the second threads being located in the cylindrical projection 102 with the second slot 82 being located in the first flat base 100 along an axis of the second threads, the first flat base 100 having a first hole 104 located adjacent the second slot 82;

attaching a lever 52 having a first end 54 with a second flat base 200 thereon to the first flat base 100 by a pin 300 that extends through a second hole 204 in the second flat base 200 and the first hole 104 such that a ledge 202 on second flat base 200 engages the second web 15, a projection 206 on the second flat base 20 engages a notch 106 in the first flat base 100 and a second end 56 of the lever 52 is offset from the first end 54 and located in a plane substantially parallel with the cylindrical projection 102, the pin 300 holding the first flat base 100 and the second flat base 200 in substantially parallel planes;

attaching a first spring 48 to the first 13 and second 15 webs to correspondingly urge the second ends 28 and 30 toward anchor block 40 on the backing plate 16;

attaching a second spring 150 to lever arm 64 on the first web 13 and to the second web 15 to correspondingly urge the first ends 22, 24 toward a hydraulic actuator 26 and the extendable strut mechanism 33, the lever arm 64 having a pawl 65 which engages the teeth on the second cylindrical surface 37 such that movement of the first 12 and second 14 brake shoes toward a drum 46 sequentially indexing on the teeth on the second cylindrical surface 37 to rotate the stem 25 causing the first threads thereon to back out of the second threads in the second end member 36 and expand the length of the strut mechanism 33 to maintain first 42 and second 44 friction members on the first 12 and second 14 brake shoes at a predetermined distance from each other to define a running clearance with a drum 46;

attaching a loop 404 on the end of a cable 400 to the second end 56 of lever 52 in a plane perpendicular to cylindrical projection 102 and backing plate 16 by pushing loop 404 through hole or opening 408 in backing plate 16 and then pushing grommet 410 into a hole 408 to seal the backing plate 16; and thereafter, a collar 412 is attached to the cable 400 to limit the length of cable 400 that is located in the interior of the backing plate 16 to assure that a force from the cable 400 does not rotate the lever 52 to impart a force which would move the web 13 away from the backing plate 16.

The backing plate 16 with the first 12 and second 14 brake shoes, hydraulic actuator 26 and adjustable strut mechanism 33 is now ready for installation on a vehicle in a manner such that a mechanical input is applied in a same plane as an axle of the vehicle to activate the parking brake.

MODE OF OPERATION

In a service operation, hydraulic fluid is supplied to hydraulic actuator assembly 26 that responds by moving friction members 42 and 44 into engagement with the brake drum 46 to effect a brake application. On actuation, ends 22 and 24 of webs 13 and 15 move toward drum 46 while ends 28 and 30 pivot about and remain in contact with anchor block 40. When webs 13 and 15 move, spring 150 acts on indexing lever 64 to move pawl 65 with respect to teeth on the second cylindrical surface 37 on stem member 35. When the end of pawl 65 moves a sufficient distance with respect to the teeth on the second cylindrical surface 37, the stem member 35 is rotated through the threaded connection which causes threads thereon to back out of threads on the second end member 36 and expand the length of the stem member 35 such that the operating clearance between friction members 42,44 and drum 46 is maintained within a desired dimension. On termination of the hydraulic pressure to the actuator assembly 26, springs 48 and 150 return or move the friction members 42,44 back to a position of rest as defined by the desired clearance defined by the current length of the strut mechanism 33.

When an operator desires to effect a parking brake function, a manual input is applied by pulling on cable 400. This input is applied along a plane perpendicular to the cylindrical projection 102 of the second end member 36 and causes the second flat base 200 to pivot on pin 300 and transfer an axial force from the ledge 202 into the second web 15 substantially along the axis of the cylindrical projection 102. The axial force is also transferred through the strut mechanism to the first end member 34 into web 13. The forces acting on the first web 13 and second web 15 moves the first 42 and second 44 friction members into engagement with a drum 46 to effect a parking brake application. On termination of the input on cable 100, springs 48, 151 return or repositions the first 42 and second 44 friction members in a rest position as illustrated in FIG. 1.

In some applications, the a second or additional spring is provided to urge the first ends 22,24 into engagement with the hydraulic actuator 26 and strut mechanism 33 but in an effort of providing simplicity only a single spring as shown in FIG. 1 is preferred.

In summary, the strut mechanism 33 and linkage arrangement 400 for providing a parking brake function provide for a simple arrangement of components that operates in a smooth manner to without introducing resultant stress force which would detract or lessen to the actuation force to effect a parking brake application.

I claim:

1. In a drum brake assembly having first and second brake shoes retained on a backing plate, each of said first and second brake shoes respectively having a first end and a second end with said first end being connected to a hydraulic actuator assembly associated with said backing plate and said second end being connected to an anchor block associated with said backing plate, said first ends being spaced apart by a strut mechanism having a extendable shaft having a first end member with a slot therein that engages a first web of said first brake shoe adjacent said first end to prevent said first end member from rotating and a second end member with a slot therein that engages a second web of said second brake shoe adjacent said first end to prevent said second end member from rotating, first resilient means for urging said first and second brake shoes toward said anchor block and second resilient means for urging said first and second brake shoes toward said hydraulic actuator assembly, said first end member of said extendable shaft being separated from said second end member by a rotatable stem, said rotatable stem having a first cylindrical surface retained in a bore in said first end member, a second cylindrical surface that engages said first end member and a third cylindrical surface with first threads thereon which mate with second threads in said second end member, said rotatable stem being adjustable to move said first end member toward said first web and said second end member toward said second web to maintain a predetermined running clearance between a drum and a first friction member on said first brake shoe and a second friction member on said second brake shoe, said hydraulic actuator assembly responding to a first input to respectively move said first friction member and said second friction member into engagement with said drum to effect a first brake application and a mechanical actuator connected to said strut mechanism for providing a second input to respectively move the first and second friction members into engagement with said drum to effect a second brake application, said mechanical actuator being characterized in that said second end member of said extendable shaft is defined by a flat base having a substantially first oval shape that transitions into a cylindrical projection, said second threads being located in said cylindrical projection with said second slot being located in said flat base along an axis of said second threads, said flat base having a first hole located adjacent said second slot; a lever having a first end with a second flat base thereon offset from said second end, said second flat base having a ledge thereon with a second hole located adjacent said ledge; a pin that extends through said first hole and said second hole to maintain said first flat base and said second flat base in substantially parallel planes with said ledge engaging said second web and said second end of said lever being in a plane substantial parallel with said cylindrical projection of said second end member; and in that linkage attached to said second end of said lever on receipt of a linear force applied to said second end along a plane perpendicular to said cylindrical projection of said second end member causes said second flat base to pivot on said pin and transfer an axial force from said ledge into said second web substantially along said axis of said cylindrical projection to effect said second brake application.

2. The drum brake as recited in claim 1 wherein said second flat base is characterized by a perpendicular projection, said perpendicular projection engaging said first flat base to provide a stop that limits the rotation of said second end of said lever away from said cylindrical projection and thereby maintain said lever in said parallel alignment.

3. The drum brake as recited in claim 2 wherein said first flat base is characterized by a notch for receiving said perpendicular projection to further define said stop.

4. The drum brake as recited in claim 3 wherein said linkage is characterized by a cable located in a plane perpendicular to said backing plate.

5. The drum brake as recited in claim 4 wherein said cable is characterized by first end having a loop located in a groove in said second end of said lever and a second end located beyond the exterior of said backing plate and a collar member secured to said cable adjacent its second end to limit the movement of its first end away from said backing plate.

6. A method of assembly of a drum brake comprising the steps of:
affixing a first brake shoe to a backing plate, said first brake shoe having a first web with a first end and a second end with a first shoulder adjacent its first end;
affixing a second brake shoe to said backing plate, said second brake shoe having a second web with a first end and a second end with a second shoulder adjacent its first end;
placing a strut mechanism between said first web and said second web such that a first slot on a first end member thereof is located on said first shoulder and receives said first web to prevent said first end member from rotating and a second slot on a second end member is located on said second shoulder and receives said second web to prevent said second end member from rotating, said first end member being separated from said second end member by a rotatable stem having a first cylindrical surface retained in a bore in said first end member, a second cylindrical surface that engages said first end member and a third cylindrical surface with first threads thereon which mate with second threads in said second end member, said second end member having a first flat base with a substantially first oval shape that transitions into a cylindrical projection, said second threads being located in said cylindrical projection with said second slot being located in said first flat base along an axis of said second threads, said first flat base having a first hole located adjacent said second slot;
attaching a lever having a first end with a second flat base thereon to said first flat base by a pin that extends through a second hole in said second flat base and said first hole such that a ledge on said second flat base engages said second web and a second end of the lever is offset from said first end and located in a plane substantially parallel with said cylindrical projection, said pin holding said first flat base and said second flat base in substantially parallel planes;
attaching a first spring to said first and second webs to urge said second ends toward an anchor block on said backing plate;
attaching a second spring to said first and second webs to urge said first ends toward a hydraulic actuator and said strut mechanism, said strut mechanism being adjustable to maintain first and second friction members on said first and second brake shoes at a predetermined distance from each other to define a running clearance with a drum; and
attaching an end of a cable to said second end of said lever in a plane perpendicular to cylindrical projection and said backing plate such that a input force applied to said second end of the lever causes said first end to rotate on said pin and impart a corresponding actuation force to said second web through said ledge substantially along an axis of said strut to effect a brake application.

7. The method as recited in claim 6 wherein said step of attaching a second spring to said first and second webs includes the step of locating said spring on a lever arm on said first web, said lever arm engaging said second cylindrical surface and on movement of said first and second brake shoes toward said drum sequentially indexing on teeth on said second cylindrical surface to rotate said stem causing said first threads to back out of said second threads and expand the length of said strut.

8. The method as recited in claim 7 wherein said step of attaching said cable further includes attaching a collar on to said cable to limit the length of cable located between said backing plate and said second end of said lever.

9. The method as recited in claim 8 wherein said step of said second flat base of said lever to said first flat base includes aligning a projection on said second flat base with a notch on said first flat base to position said ledge adjacent said second web.

10. The drum brake as produced by the method as recited in claim 6.

* * * * *